(No Model.)

J. G. SOWERBY.
MOLD FOR MOLDING ARTICLES OF GLASS, &c.

No. 357,867. Patented Feb. 15, 1887.

Witnesses
H. A. Lamb
G. H. Campbell

Inventor
John George Sowerby
By his Attorney
Frankland Jannus

UNITED STATES PATENT OFFICE.

JOHN GEORGE SOWERBY, OF GATESHEAD-ON-TYNE, COUNTY OF DURHAM, ENGLAND.

MOLD FOR MOLDING ARTICLES OF GLASS, &c.

SPECIFICATION forming part of Letters Patent No. 357,867, dated February 15, 1887.

Application filed December 1, 1886. Serial No. 220,424. (No model.) Patented in England June 8, 1885, No. 6,937.

*To all whom it may concern:*

Be it known that I, JOHN GEORGE SOWERBY, a subject of the Queen of England, residing at Gateshead-on-Tyne, in the county of Durham and Kingdom of England, have invented a new and useful Improvement in Molds for Molding Articles of Glass or other Ware, (for which I have obtained a patent in Great Britain, No. 6,937, bearing date June 8, 1885,) of which the following is a specification.

My invention relates to an improved construction of mold whereby I am enabled to make a handled glass mug or pitcher or similar article without any joints or mold-marks appearing upon its surface; and it consists, particularly, in the combination of a top ring with the body of the mold, as hereinafter described, reference being had to the accompanying drawings, in which—

Figure 1:
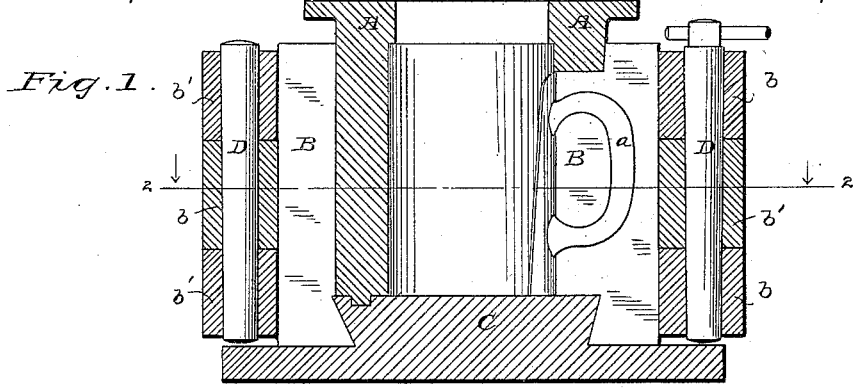
Figure 2:
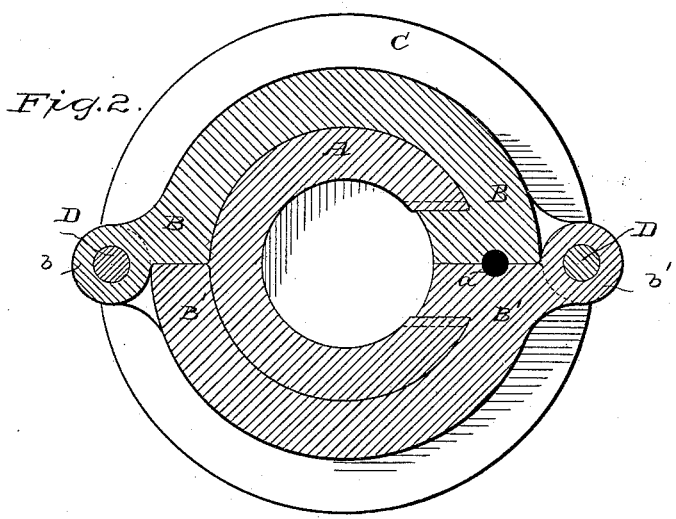
Figure 3:
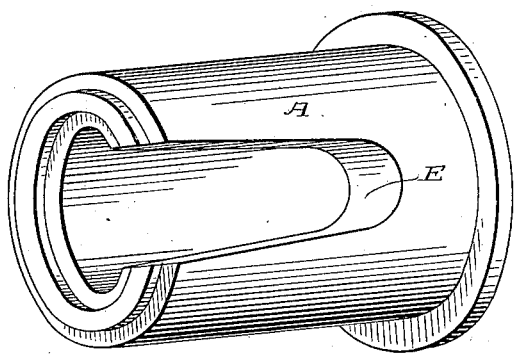

Figure 1 represents in sectional elevation a mold embodying my improvements. Fig. 2 is a transverse section thereof, and Fig. 3 is a perspective view of the ring detached from the mold.

Similar letters denote like parts throughout.

B B' are the separable portions of a glass-mold, and are united and held together by means of pins D D passing through the hinges b b'. The separable portions are suitably grooved at a, to receive the material to form the handle, and when separated to permit of its removal.

C is the bottom piece, which fits into and is held in position by the closing together of the pieces B B'.

A is the combined top ring and body, and is formed to fit down inside the mold, and to close or break the joints, and in that manner prevent the glass from being forced thereinto and producing the mold-marks, which are so objectionable. The "ring" is a cylinder formed with a slit or opening, E, on one side to admit of the formation of the handle, and it extends upward far enough to give the desired height to the article being produced. It will be evident that the number of openings and the height of the cylinder can be varied to allow of the production of many different forms.

In working this mold the jointed parts B are fastened around the bottom C, and the top ring and body A then placed inside B, fitting over the handle and resting on C. When the mug, pitcher, or other article is made, the combined top ring and body A is lifted off the jointed parts B B', the pins D are removed to permit the mold to open, and the article is taken out.

It will be understood that the mode of joining the several parts of my improved mold may be modified, as also the method of holding the parts B together by the pins D, while retaining the essential features of my invention, and that the shape of the mold is necessarily determined by that of the article to be produced.

Having fully described my invention, what I desire to claim and secure by Letters Patent is—

1. The combination, with a separable mold, of a removable part or ring arranged to fit inside of said mold, and thereby to prevent the entrance of the plastic material into the joints of the separable portion, substantially as shown and described.

2. In a mold for molding articles of glass or other ware, the combination, with the body of the mold, of a ring, A, arranged to break the joints in said mold, and thereby prevent the entrance of plastic glass, substantially as shown and described.

JOHN GEORGE SOWERBY.

Witnesses:
 JOHN WILLIAM SOWERBY,
 JOHN GUTHRIE WRIGHT.